(12) United States Patent
Nahidi et al.

(10) Patent No.: US 11,529,948 B2
(45) Date of Patent: Dec. 20, 2022

(54) ARCHITECTURE AND METHODOLOGY OF LIMIT HANDLING INTENDED DRIVER COMMAND INTERPRETER TO ACHIEVE MAXIMUM LATERAL GRIP

(71) Applicant: GM GLOBAL TECHNOLOGY OPERATIONS LLC, Detroit, MI (US)

(72) Inventors: Seyedeh Asal Nahidi, North York (CA); SeyedAlireza Kasaiezadeh Mahabadi, Shelby Township, MI (US); James H. Holbrook, Fenton, MI (US); John R. Yost, Southfield, MI (US); Hualin Tan, Novi, MI (US); Xueying Kang, Novi, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 16/392,005

(22) Filed: Apr. 23, 2019

(65) Prior Publication Data

US 2020/0339104 A1 Oct. 29, 2020

(51) Int. Cl.
*B60W 30/02* (2012.01)
*B60W 50/10* (2012.01)

(52) U.S. Cl.
CPC ............ *B60W 30/02* (2013.01); *B60W 50/10* (2013.01); *B60W 2720/12* (2013.01); *B60W 2720/14* (2013.01)

(58) Field of Classification Search
CPC .................. B60W 30/02; B60W 50/10; B60W 2720/12; B60W 2720/14
See application file for complete search history.

(56) References Cited

U.S. PATENT DOCUMENTS

| | | | | |
|---|---|---|---|---|
| 5,941,919 A | * | 8/1999 | Pastor | B60T 8/1755 701/36 |
| 6,658,342 B1 | * | 12/2003 | Hac | B60T 8/1755 303/140 |
| 7,451,032 B2 | * | 11/2008 | Brown | B60R 21/0132 180/282 |
| 8,073,607 B2 | | 12/2011 | Sidlosky et al. | |
| 8,565,993 B2 | * | 10/2013 | Lu | B60W 30/045 701/70 |

(Continued)

FOREIGN PATENT DOCUMENTS

| | | | |
|---|---|---|---|
| JP | 2006315661 A | * | 11/2006 |
| JP | 2010151205 A | * | 7/2010 |

OTHER PUBLICATIONS

Shimodaira et al. Machine Translation of Japanese Patent Application JP 2010151205 A, 2010. (Year: 2010).*

(Continued)

*Primary Examiner* — James J Lee
*Assistant Examiner* — Tawri M Matsushige
(74) *Attorney, Agent, or Firm* — Cantor Colburn LLP (57) ABSTRACT

A vehicle, and a method and system for operating the vehicle. The system includes a processor. The processor receives a driver input at the vehicle, determines a current lateral force on a tire of the vehicle for the driver input, determines a desired yaw rate and lateral velocity for the vehicle based on the current lateral force on the tire that operates the vehicle at a maximum yaw moment, and operates the vehicle at the desired yaw rate and lateral velocity.

9 Claims, 9 Drawing Sheets

(56) References Cited

U.S. PATENT DOCUMENTS

| | | | |
|---|---|---|---|
| 2002/0109402 A1* | 8/2002 | Nakamura | B60T 8/17552 303/146 |
| 2002/0143451 A1* | 10/2002 | Hac | B62D 7/159 701/72 |
| 2003/0074122 A1* | 4/2003 | Hac | B62D 6/003 701/41 |
| 2003/0125847 A1* | 7/2003 | Tinskey | B60K 23/0808 701/1 |
| 2005/0033486 A1* | 2/2005 | Schmitt | B60T 8/17554 701/1 |
| 2008/0208406 A1 | 8/2008 | Chen et al. | |
| 2008/0221766 A1* | 9/2008 | Maeda | B60T 8/1755 701/70 |
| 2009/0118905 A1* | 5/2009 | Takenaka | B60W 40/064 701/41 |
| 2010/0174463 A1* | 7/2010 | Uragami | B60W 40/11 701/70 |
| 2012/0055744 A1* | 3/2012 | Chen | B60T 8/267 188/106 P |
| 2013/0144476 A1* | 6/2013 | Pinto | B60T 8/17555 701/22 |
| 2014/0145498 A1* | 5/2014 | Yamakado | B60W 30/02 303/3 |
| 2017/0057493 A1* | 3/2017 | Sato | B60W 30/02 |
| 2019/0256094 A1 | 8/2019 | Kasaiezadeh Mahabadi et al. | |
| 2019/0276009 A1* | 9/2019 | Okada | B60W 40/068 |

OTHER PUBLICATIONS

Yamaguchi et al. Machine Translation of Japanese Patent Application JP 2006315661A, 2006 (Year: 2006).*

* cited by examiner

ARCHITECTURE AND METHODOLOGY OF LIMIT HANDLING INTENDED DRIVER COMMAND INTERPRETER TO ACHIEVE MAXIMUM LATERAL GRIP

INTRODUCTION

The subject disclosure relates to driver-assisted performance vehicles and, in particular, a method and system of operating performance vehicles at a maximum tire capacity.

A performance vehicle is a vehicle that is designed and constructed specifically for speed. Performance vehicles typically include a Driver Command Interpreter (DCI) for controlling driving outside of a linear or normal range of operation for the vehicle. The performance vehicle is often operated by integrating a vehicle model over time in order to generate various reference signals, such as yaw rate and lateral velocity. However, integration error can be introduced that leads to a numerical drift in the vehicle model or instability in the model. Accordingly, it is desirable to be able to determine these parameter without use of integration methods.

SUMMARY

In one exemplary embodiment, a method of operating a vehicle is disclosed. A driver input is received at the vehicle. A current lateral force on a tire of the vehicle is determined for the driver input. A desired yaw rate and lateral velocity is determined for the vehicle that operates the vehicle at a maximum yaw moment, based on the current lateral force on the tire. The vehicle is operated at the desired yaw rate and lateral velocity.

In addition to one or more of the features described herein, the method further includes determining a maximum lateral force on the tire corresponding to the current lateral force on the tire and determining the maximum yaw moment from the maximum lateral force. The method further determines the desired yaw rate and lateral velocity at which the maximum yaw moment is substantially zero. The method further determines the desired yaw rate and desired lateral velocity at which front and rear tires of the vehicle saturate at the same time. The method further determines the desired yaw rate and lateral velocity using a least squares method. The method further includes comparing the current lateral force on the tire to a lateral force capacity of the tire in order to select a performance mode of the vehicle. The method further includes inputting the desired yaw rate and desired lateral velocity into a Driver Command Interpreter of the vehicle.

In another exemplary embodiment, a system for operating a vehicle is disclosed. The system includes a processor configured to receive a driver input at the vehicle, determine a current lateral force on a tire of the vehicle for the driver input, determine a desired yaw rate and lateral velocity for the vehicle based on the current lateral force on the tire that operates the vehicle at a maximum yaw moment, and operate the vehicle at the desired yaw rate and lateral velocity.

In addition to one or more of the features described herein, the processor is further configured to determine a maximum lateral force on the tire corresponding to the current lateral force on the tire and determining the maximum yaw moment from the maximum lateral force. The processor is further configured to determine the desired yaw rate and lateral velocity at which the maximum yaw moment is substantially zero. The processor is further configured to determine the desired yaw rate and desired lateral velocity at which front and rear tires of the vehicle saturate at the same time. The processor is further configured to determine the desired yaw rate and lateral velocity using a least squares method. The processor is further configured to compare the current lateral force on the tire to a lateral force capacity of the tire in order to select a performance mode of the vehicle. The processor is further configured to input the desired yaw rate and desired lateral velocity into a Driver Command Interpreter of the vehicle.

In yet another exemplary embodiment, a vehicle is disclosed. The vehicle includes a processor. The processor is configured to receive a driver input at the vehicle, determine a current lateral force on a tire of the vehicle for the driver input, determine a desired yaw rate and lateral velocity for the vehicle based on the current lateral force on the tire that operates the vehicle at a maximum yaw moment, and operate the vehicle at the desired yaw rate and lateral velocity.

In addition to one or more of the features described herein, the processor is further configured to determine a maximum lateral force on the tire corresponding to the current lateral force on the tire and determining the maximum yaw moment from the maximum lateral force. The processor is further configured to determine the desired yaw rate and lateral velocity at which the maximum yaw moment is substantially zero. The processor is further configured to determine the desired yaw rate and desired lateral velocity at which front and rear tires of the vehicle saturate at the same time. The processor is further configured to determine the desired yaw rate and lateral velocity using a least squares method. The processor is further configured to determine compare the current lateral force on the tire to a lateral force capacity of the tire in order to select a performance mode of the vehicle.

In addition to one or more of the features described herein, the driver input includes at least one of an accelerator pedal position and a brake pedal position. In addition, the driver input may include a steering wheel angle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
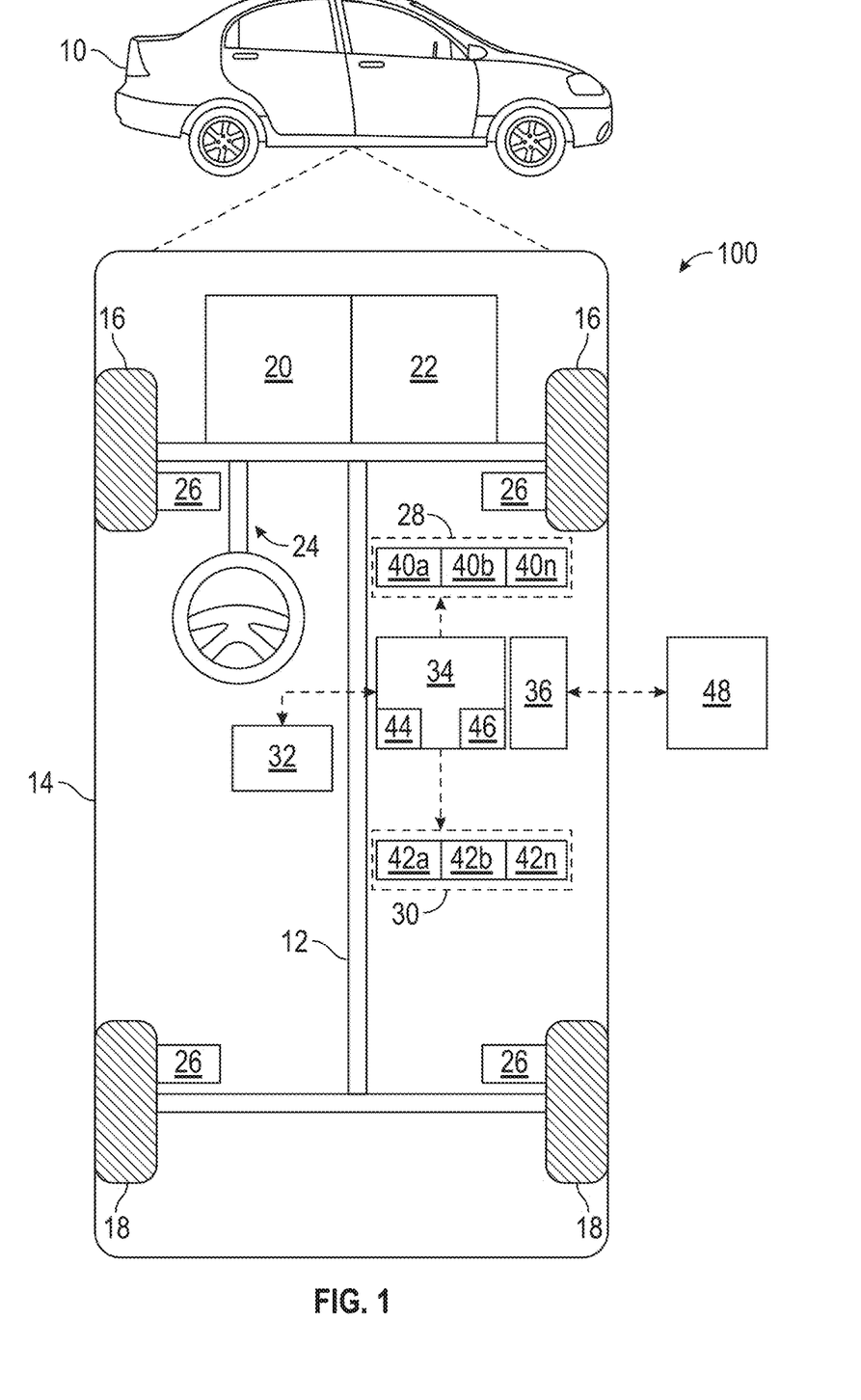
FIG. 1 shows a vehicle including an associated trajectory planning system shown generally at in accordance with various embodiments.

In accordance with an exemplary embodiment, FIG. 1 shows a vehicle 10 including an associated trajectory planning system shown generally at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the trajectory planning system 100 and, when executed by the processor 44, generates a trajectory output that addresses kinematic and dynamic constraints of the environment. In an example, the instructions received are input process sensor and map data. The instructions perform a graph-based approach with a customized cost function to handle different road scenarios in both urban and highway roads.

Figure 2:
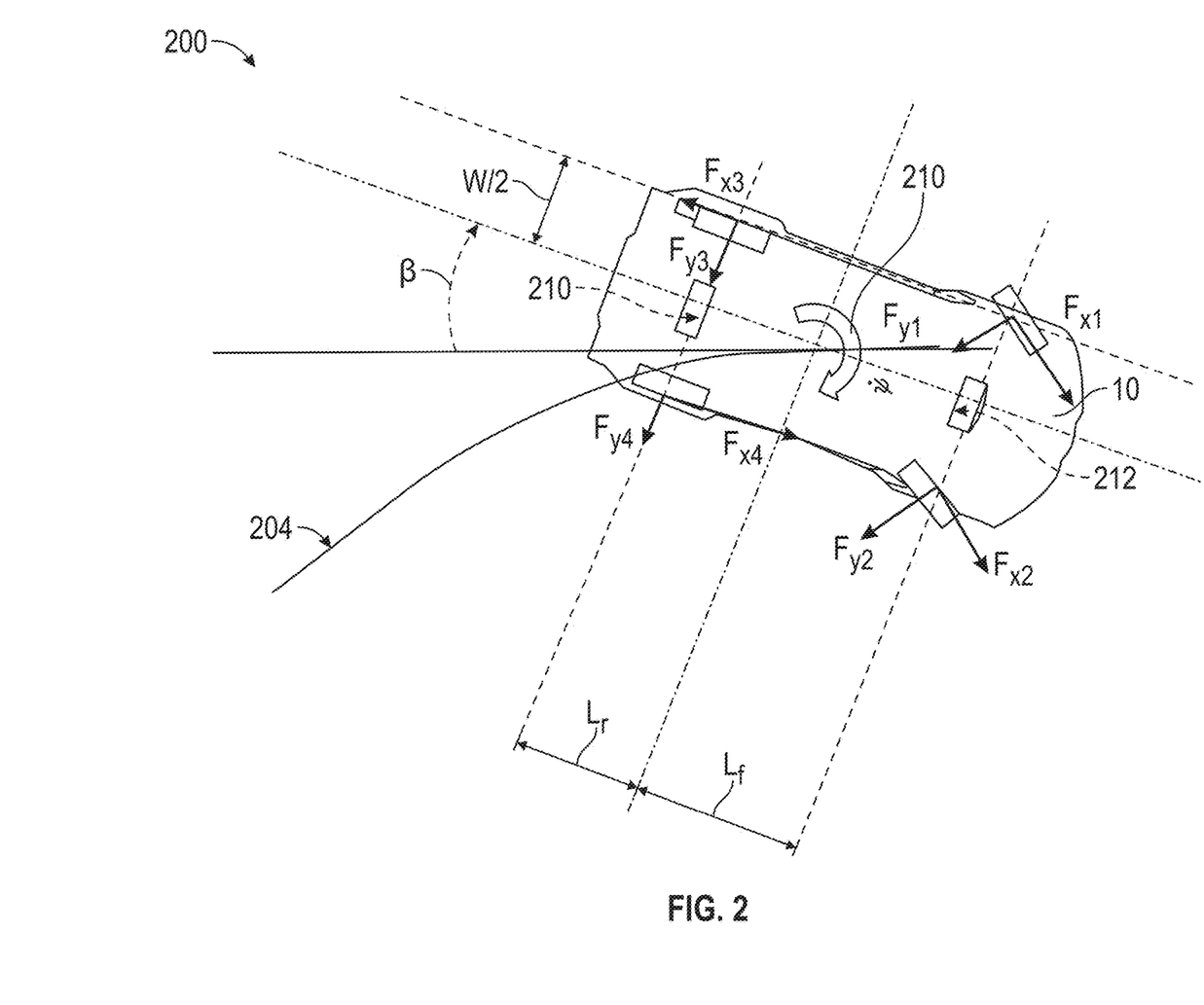
FIG. 2 shows a top view of the vehicle illustrating various forces on the vehicle during a maneuver.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The processor 44 further includes programs for operating the vehicle in at least one of two modes of operation; a standard mode of operation, and a performance mode of operation. In the standard mode of operation, the processor 44 operates a standard model of the vehicle that provides a linear relation between driver's inputs and vehicle dynamics. The standard model receives driver's inputs and determines a dynamic parameter of the vehicle based on the driver's inputs. The standard model generates actuator commands for the actuators of the vehicle and the processor 44 sends these command to the actuators in order to generate the dynamic parameter at the vehicle. A dynamic parameter in the standard mode can include a yaw rate of the vehicle, for example.

In the performance mode of operation, the processor 44 operates a performance model of the vehicle 10. The performance model is generally a non-linear model of the vehicle and generally takes in more input than the standard model in order to determine a dynamic parameter for the vehicle. For example, the standard model generally takes a driver's steering wheel angle as an input, while the performance model generally takes a tractive torque on a tire and a braking torque on the tire in addition to the steering wheel angle in order to determine the dynamic parameter. Thus, the performance model includes inputs from the accelerator pedal and brake pedal in addition to the steering wheel angle in order to define the dynamic states of the vehicle 10. The performance mode further uses several actuators that are not used in the standard mode of operation. Exemplary performance actuators used in the performance mode of operation include, but are not limited to electronically-limited slip differential actuator (eLSD) which controls a left-right torque distribution at the vehicle, an electronic All-Wheel Drive actuator (eAWD) which controls a front-back torque-distribution at the vehicle and a differential braking actuator (DB).

FIG. 2 shows a top view 200 of the vehicle 10 illustrating various forces on the vehicle during a maneuver. The vehicle 10 is shown moving along a selected trajectory 204. Tire forces $(F_{x1}, F_{y1})$, $(F_{x2}, F_{y2})$, $(F_{x3}, F_{y3})$ and $(F_{x4}, F_{y4})$ are shown for each of the tires. The yaw rate $\psi$ is indicated by rotational arrow 205. Performance mode actuators are also shown. For example, the eLSD 210 is located between the rear wheels and controls a left-right torque distribution at the vehicle. The eAWD 212 is located between the front wheels and which controls a front-back torque-distribution at the vehicle. Another actuator, the Active-Aero actuator (not shown) helps to control the normal force on the tires of the vehicle 10.

Figure 3:
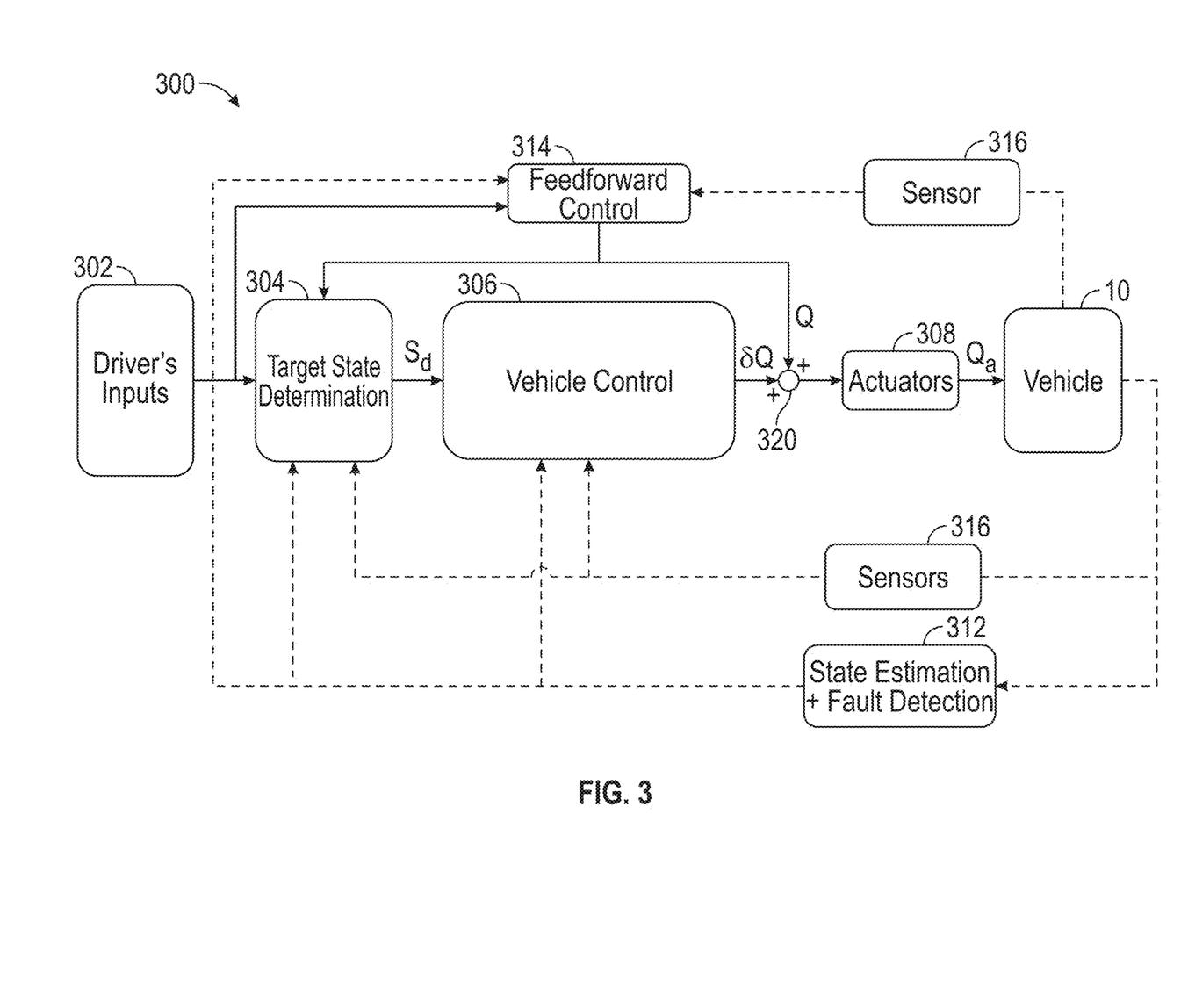
FIG. 3 shows a control structure for operating the vehicle in a driver-assisted mode.

FIG. 3 shows a control structure 300 for operating the vehicle 10 in a driver-assisted mode. In various aspects, the control structure 300 includes various modules that operate on the processor 44 in order to translate a driver's intentions into actual motion of the vehicle. The control structure 300 includes a target state determination module 304, a vehicle control module 306, and actuators 308. The target state determination module 304 determines a desired state of the vehicle based on driver's inputs. The vehicle control module 306 determines a command control adjustment based on the desired state and operates actuators 308 in order to control the vehicle 10.

The control structure 300 receives driver's inputs 302, such as a steering wheel angle, a brake pedal position and an accelerator pedal position, from the driver. The driver's inputs 302 are provided to the target state determination module 304. The target state determination module 304 computes a desired state $(S_d)$ based on the driver's inputs and provides the desired state $S_d$ to the vehicle control module 306. The desired state $S_d$ can include, but is not limited to, a desired yaw rate of the vehicle 10 and a desired lateral velocity of the tires. The driver's inputs are also provided to a feedforward control module 314.

The vehicle control module 306 generates an actuator adjustment command $(\delta Q)$ for the vehicle based on the desired state $S_d$. The actuator adjustment command $\delta Q$ can be added to an actuator command $(Q)$ that corresponds to the driver's inputs at a summer 320. The actuator command Q is provided from the feedforward control module 314. The summation $(Q+\delta Q)$ is provided to the actuators 308 in order to provide an action $Q_a$ that operates the vehicle 10. The actuators can include, for, the eLSD, the eAWD, a differential braking actuator (dB) and the Active-Aero actuator. The actuators are used to generate the desired states (e.g., yaw rate and side lateral velocity of the tires) at the vehicle 10. In various embodiments, the actuator commands can be adjusted to ensure that they do not exceed a capacity of either the tires of the vehicle or of the road.

The vehicle 10 thus undergoes the desired dynamic state, such as the desired yaw rate and/or the desired lateral velocity of the tires. Sensors 316 on the vehicle 10 can detect these dynamic parameters and their values. In addition, a vehicle state estimate and fault detection module 312 can estimate the values of these dynamic parameters. The sensed values of these dynamic parameters and the estimated values of these dynamic parameters can be provided to the vehicle control modules 306 in order to help the vehicle control module 306 determine the command actuator adjustment $\delta Q$ for a next time step of the vehicle control. Theses sensed and estimated values can also be provided to the target state determination module 304 in order to control calculation of the desired state $S_d$. Such feedback prevents the desired state $S_d$ generated by the target state determination module 304 from changing too rapidly. The sensed values and estimated values can be further provided to the feedforward control module 314.

In an embodiment, the processor performs a method of operating the performance vehicle in a manner that achieves a maximum lateral grip of the tires of the vehicle. The maximum lateral grip is determined based on current tire forces and a maximum tire capacity. In one embodiment, the desired yaw rate and lateral velocity are determined without using integration techniques on the vehicle model, therefore allowing the determination of these state variables without the introduction of integration errors.

Figure 4:
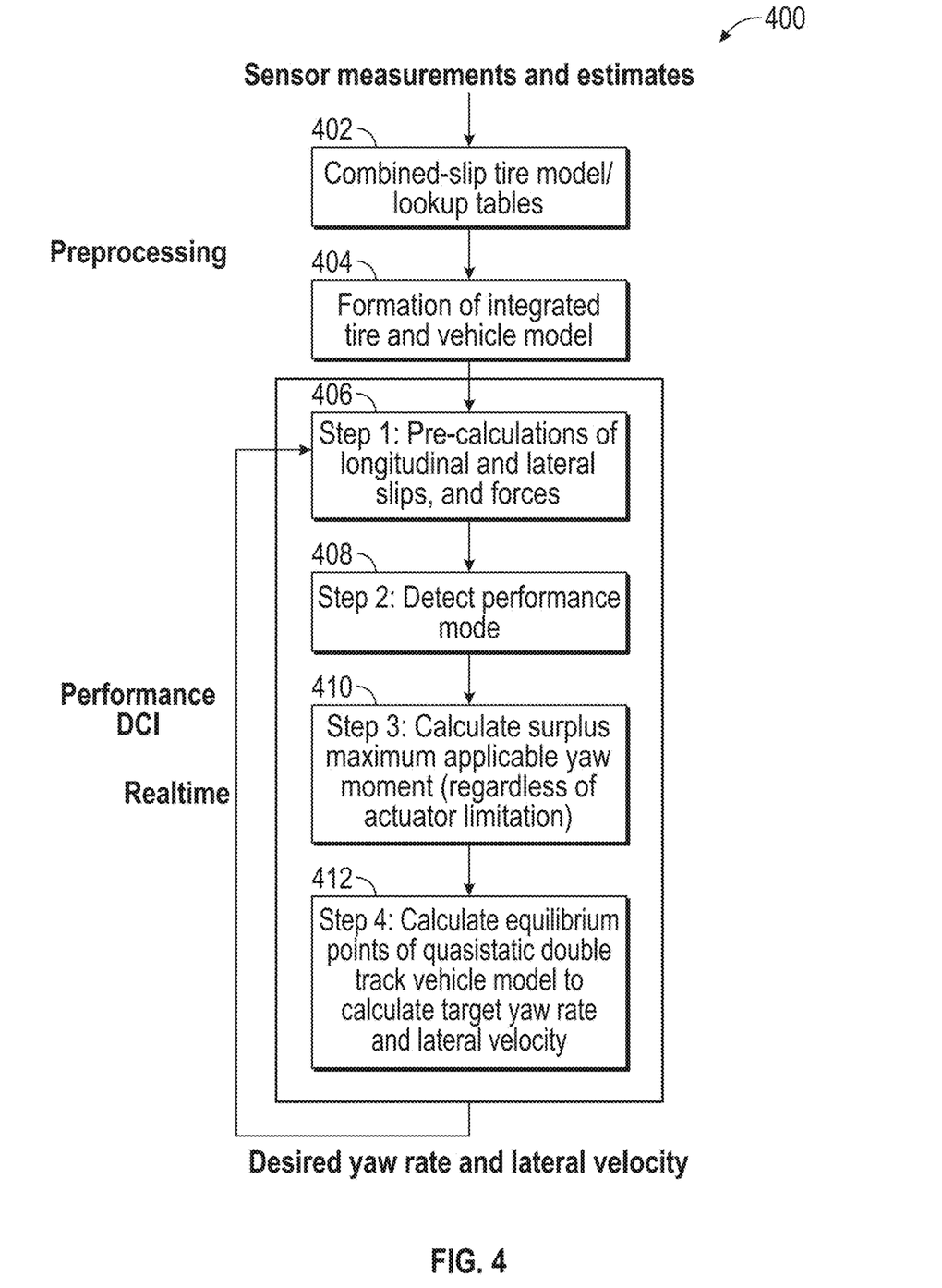
FIG. 4 is a flowchart illustrating a method of operating a performance vehicle according to an embodiment of the invention.

FIG. 4 a flowchart illustrating a method 400 of operating a performance vehicle according to an embodiment. The flowchart includes a pre-processing stage in which various vehicle and tire models are assembled as well as lookup tables for used during a real-time processing stage. In box 402, combined slip-tire models and look-up tables are assembled. In box 404, integrated vehicle and tire models are assembled.

The real-time processing stage follows the pre-processing stage and includes boxes 406, 408, 410 and 412. In box 406, calculations are made to determine the various kinematic parameters acting on the vehicle and on the tires, such as lateral and longitudinal velocities, lateral and longitudinal slip, etc. In box 408, a driver's request is observed in order to determine operating in a performance mode. In box 410, the maximum yaw moment available to the vehicle is determined based on the current forces, etc. on the vehicle. In box 412, targeted or desired yaw rate and lateral velocity are determined using a vehicle model. The desired yaw rate and lateral velocity can be determined by a locating equilibrium points in the vehicle model. In various embodiments, a Levenberg-Marquart method or other suitable least-squares curve fitting algorithm can be used to locate the equilibrium points.

The kinematic parameters of the vehicle can be determined using the Eqs. (1)-(20) disclosed below in order to determine forces on the tires of the vehicle. Sensors can be used to determine the velocity of the vehicle, which can be decomposed into a longitudinal velocity ($u_{CG}$) and a lateral velocity ($v_{CG}$), where CG is a center of gravity of the vehicle. The longitudinal velocity of each tire can be determined from the longitudinal velocity of the center of gravity ($u_{CG}$) and the effects of a yaw rotation of the vehicle, as shown below in Eqs. (1)-(4):

$$u_{FL} = u_{CG} - \dot\psi T_F \qquad \text{Eq. (1)}$$

$$u_{FR} = u_{CG} + \dot\psi T_F \qquad \text{Eq. (2)}$$

$$u_{RL} = u_{CG} - \dot\psi T_R \qquad \text{Eq. (3)}$$

$$u_{RR} = u_{CG} - \dot\psi T_R \qquad \text{Eq. (4)}$$

where FL refers to front left, FR refers to front right, RL refers to rear left and RR refers to rear right. $T_F$ is the front track width or perpendicular distance from the front tires to the longitudinal axis and $T_R$ is the rear track width or perpendicular distance from the rear tires to the longitudinal axis, as shown in FIG. 2, and $\dot\psi$ is the yaw rate of the vehicle.

From Eqs. (1)-(4), the relative longitudinal velocity can be determined from consideration of the tire rotation, as discussed below in Eqs. (5)-(8):

$$u_{FL_{rel}} = R_{eff}\omega_{FL} - u_{FL} \qquad \text{Eq. (5)}$$

$$u_{FR_{rel}} = R_{eff}\omega_{FR} - u_{FR} \qquad \text{Eq. (6)}$$

$$u_{RL_{rel}} = R_{eff}\omega_{RL} - u_{RL} \qquad \text{Eq. (7)}$$

$$u_{RR_{rel}} = R_{eff}\omega_{RR} - u_{RR} \qquad \text{Eq. (8)}$$

where $\omega_i$ is the rotational velocity of the $i^{th}$ tire and $R_{eff}$ is the effective radius of the tire. These relative longitudinal velocities can be used to determine longitudinal slip ratios.

Lateral velocity can be determined as shown in Eqs. (9)-(12)

$$v_{FL} = \delta_{FL} \times u_{FL} - (v_{CG} + \dot\psi L_F) \qquad \text{Eq. (9)}$$

$$v_{FR} = \delta_{FR} \times u_{FR} - (v_{CG} + \dot\psi L_F) \qquad \text{Eq. (10)}$$

$$v_{RL} = \delta_{RL} \times u_{RL} - (v_{CG} + \dot\psi L_R) \qquad \text{Eq. (11)}$$

$$v_{RR} = \delta_{RR} \times u_{RR} - (v_{CG} + \dot\psi L_R) \qquad \text{Eq. (12)}$$

where $v_i$ is the lateral velocity of the $i^{th}$ tire and $\delta_i$ is the steering angle of the $i^{th}$ tire. The relative lateral velocities are determined as shown below in Eqs. (13)-(16), and can be used to determine lateral slip ratios.

$$v_{FL_{rel}} = -v_{FL} \qquad \text{Eq. (13)}$$

$$v_{FR_{rel}} = -v_{FR} \qquad \text{Eq. (16)}$$

$$v_{RL_{rel}} = -v_{RL} \qquad \text{Eq. (17)}$$

$$v_{RR_{rel}} = -v_{RR} \qquad \text{Eq. (18)}$$

Once the relative longitudinal velocity and relative lateral velocity are determined for a tire, the actual longitudinal and lateral forces can be calculated for the tire. In one method a combined slip tire model can be used to determine longitudinal and lateral forces, such as in Eqs. (19)-(20):

$$F_Y = f(u_{rel}, v_{rel}) \qquad \text{Eq. (19)}$$

$$F_X = g(u_{rel}, v_{rel}) \qquad \text{Eq. (20)}$$

where f and g are standard tire models. Alternatively, the actual forces $F_Y$ and $F_X$ can be determined using empirical tire lookup tables.

Figure 5A:
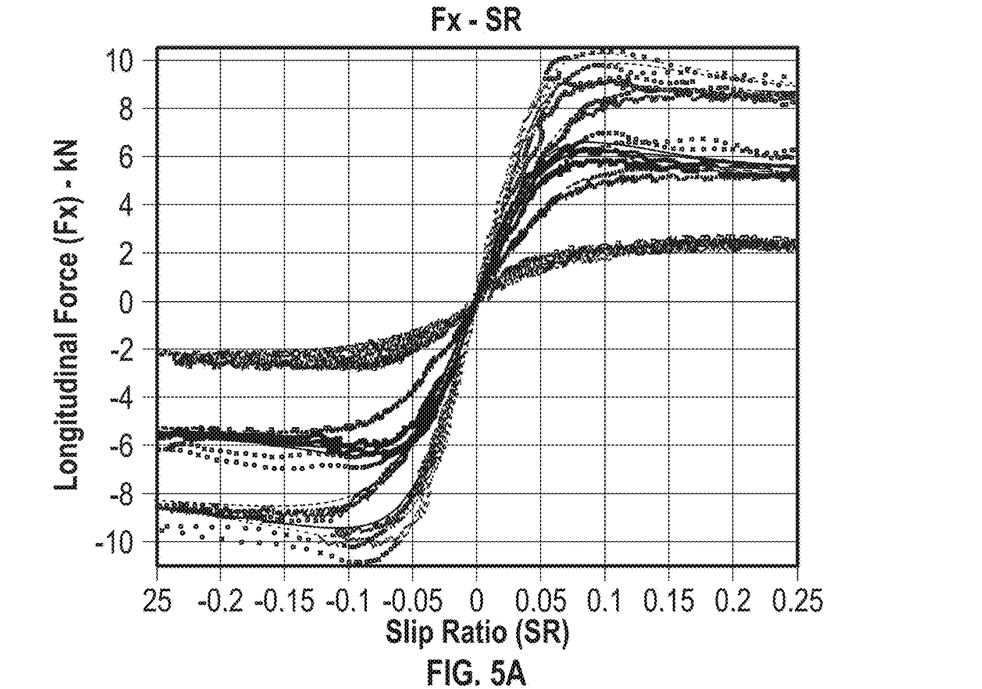
FIGS. 5A-D shows various tire models that can be used to determine longitudinal and lateral forces on the tire.
Figure 5B:
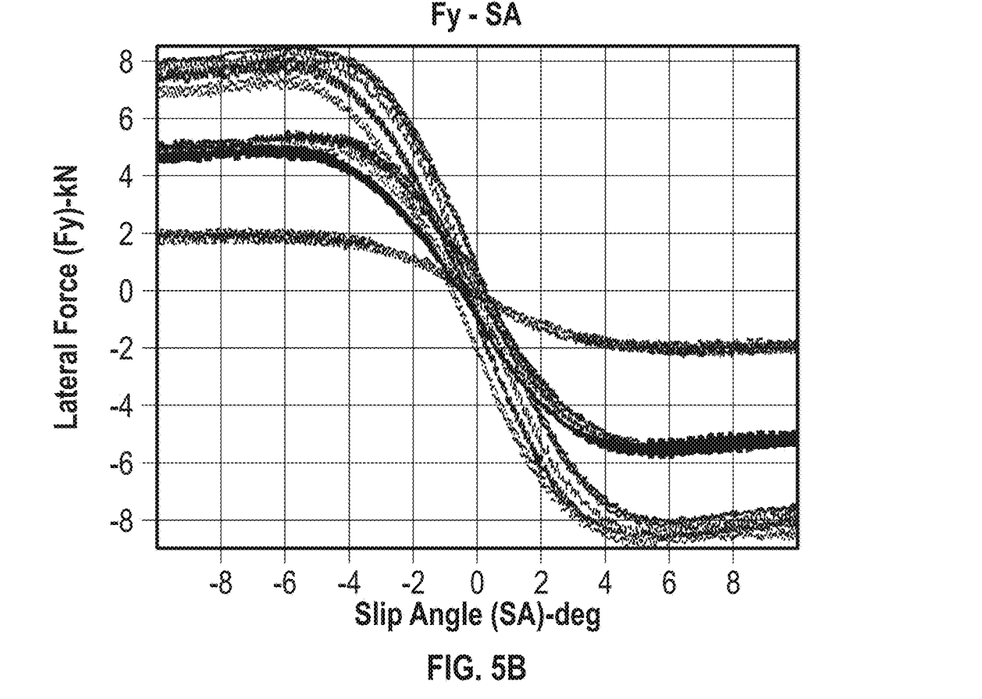
Figure 5C:
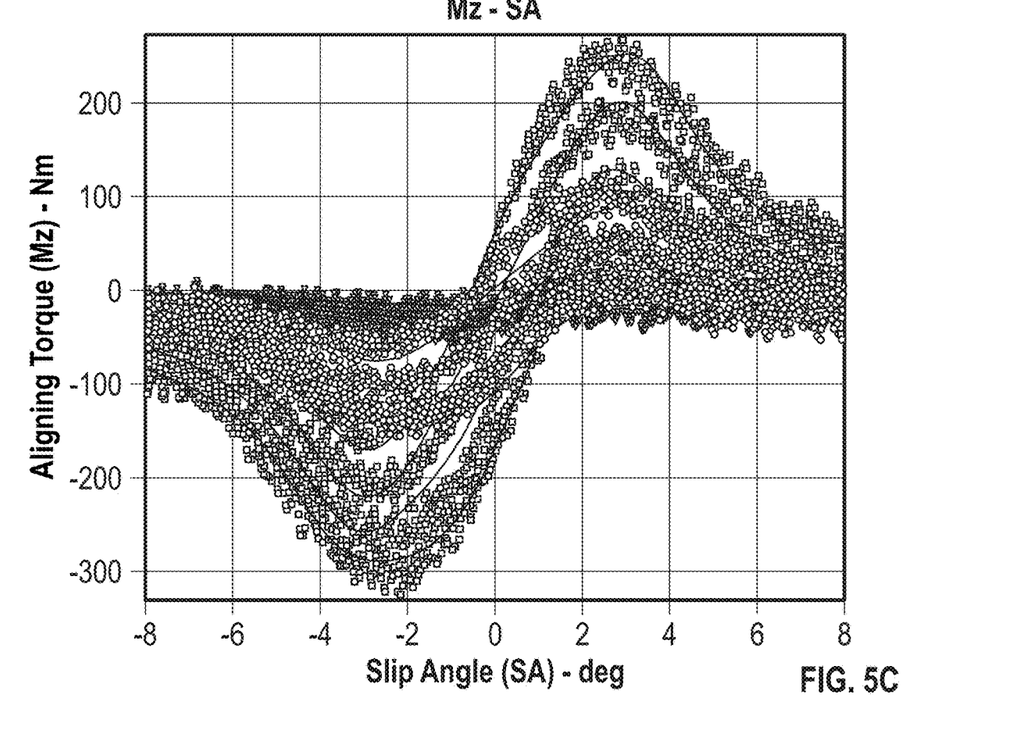
Figure 5D:
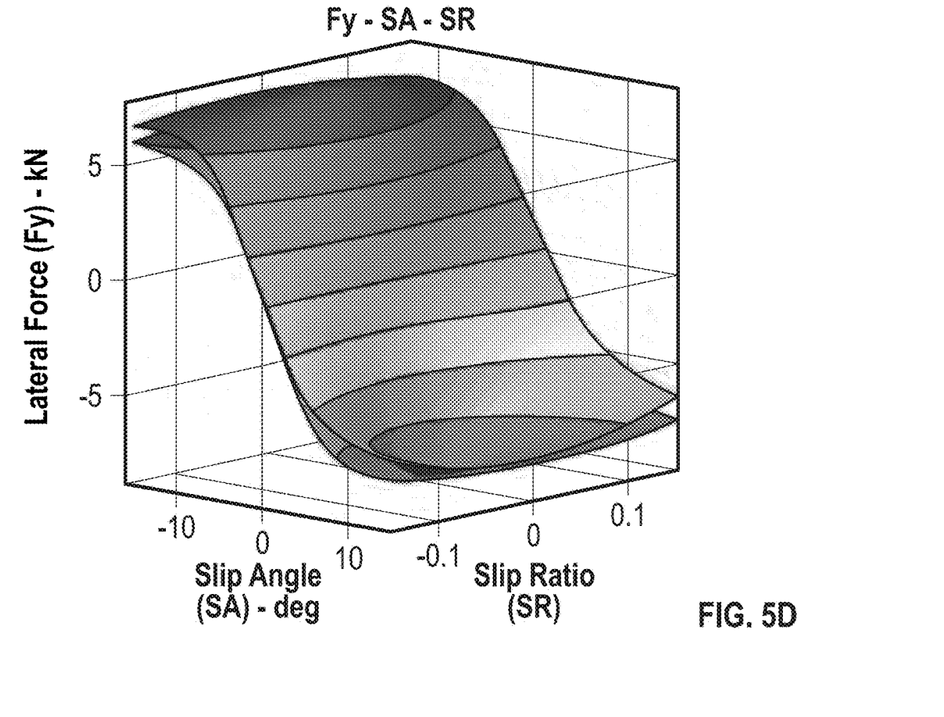

FIGS. 5A-D show various tire models that can be used to determine longitudinal and lateral forces on a tire. FIG. 5A shows a relation between longitudinal force ($F_X$) and slip ratio for a plurality of slip angles. FIG. 5B shows a relation between lateral forces ($F_Y$) and slip angle for a plurality of slip ratios. FIG. 5C shows a relation between torque and slip angle. FIG. 5D shows a relation between lateral force, slip angle and slip ratio.

Once the actual lateral and longitudinal forces on a tire have been determined, these forces can be compared to a lateral force capacity of the tire in order to determine whether or not or the vehicle is in a normal driving mode.

Figure 6:
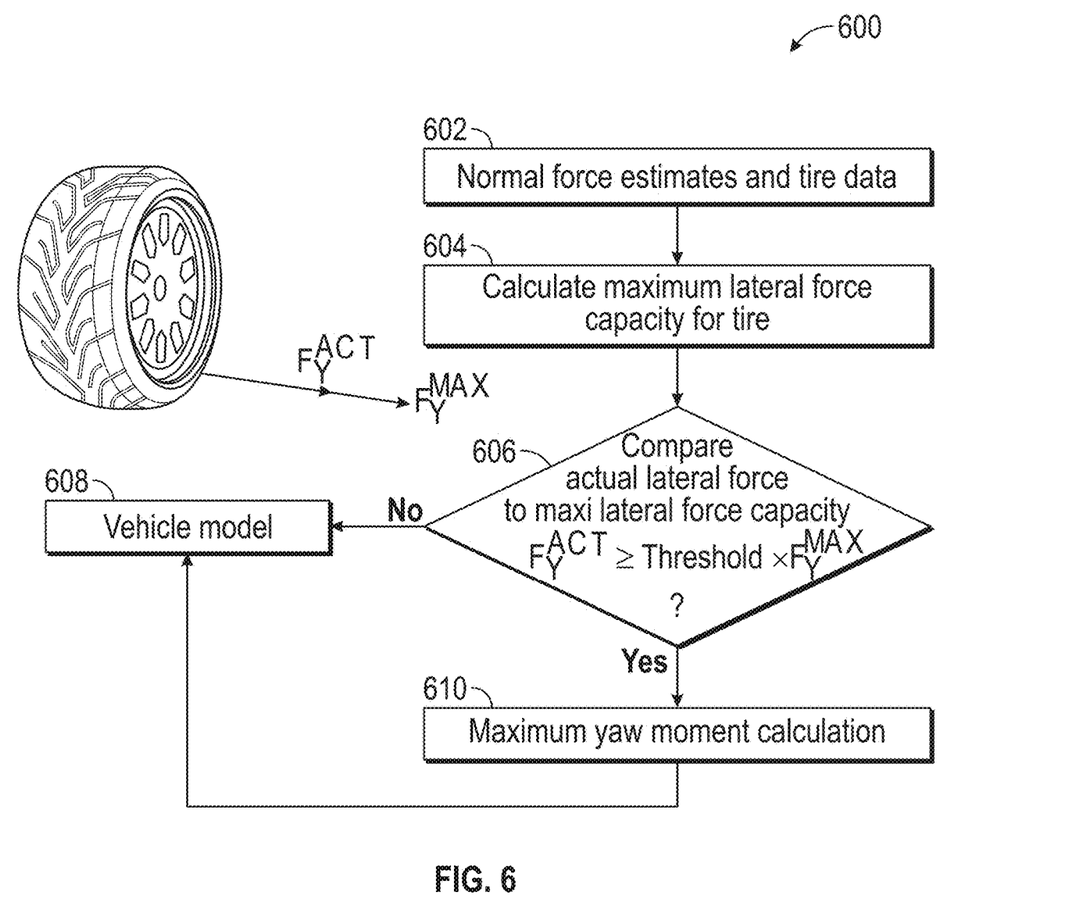
FIG. 6 shows a flow chart illustrating a method of detecting a performance mode for the vehicle.

FIG. 6 shows a flow chart 600 illustrating a method of detecting a performance mode. In box 602, estimates of the normal forces and tire data are provided. In box 604, the maximum lateral force capacity for the tire is determined. In box 606, the actual lateral forces are compared to the maximum lateral force capacity of the tire. If, at box 606, the actual lateral force is less than the maximum lateral force capacity of the tire times a selected threshold, then the method proceeds to box 608 where the vehicle is driven in a normal mode and the procedure calculates a vehicle model within the linear range of the vehicle. If, at box 606, the actual lateral force is equal to or greater than the maximum lateral force capacity of the tire times the selected threshold, then the method proceeds to box 610 where vehicle is operated in a performance mode. In the performance mode, a maximum yaw moment is calculated as a state parameter. This maximum yaw moment is then provided to the vehicle model to calculate a desired yaw rate and desired lateral force on tires, which can be used to operate the vehicle.

When it is determined that the vehicle is to operate in a performance mode, as in box 610, calculations are performed to determine a maximum yaw moment. The maximum applicable yaw moment is the yaw moment that is produced when the tire is being operated at its maximum lateral grip. The maximum applicable yaw moment is a combination of its lateral component and longitudinal component, as shown in Eq. (21):

$$M_z^{max} = M_{z,Fy}^{max} + M_{z,Fx}^{max} \qquad \text{Eq. (21)}$$

where $M_z^{max}$ is the maximum yaw moment of a tire, $M_{z,Fy}^{max}$ is the maximum yaw moment due to the lateral force on the tire and $M_{z,Fx}^{max}$ is the maximum yaw moment due to the longitudinal force on the tire. The maximum yaw moment due to lateral forces can be written as:

$$M_{z,Fy}^{max} = L_f \times F_{y,front}^{max} - L_r \times F_{y,rear}^{max} \qquad \text{Eq. (22)}$$

When $M_z^{max} > 0$, then the rear tires are the first to saturate. When $M_z^{max} < 0$, the front tires are the first to saturate. When $M_z^{max} = 0$, then both the front tires and rear tires saturate simultaneously or together. Thus, the condition for both axles to reach the maximum grip of their tires at the same time is given by Eq. (23):

$$M_{z,Fy}^{max} = -M_{z,Fx}^{max} \qquad \text{Eq. (23)}$$

The maximum lateral forces can be determined using several methods, including a tire ellipse, one-dimensional interpolation and two-dimensional interpolation.

Figure 7:
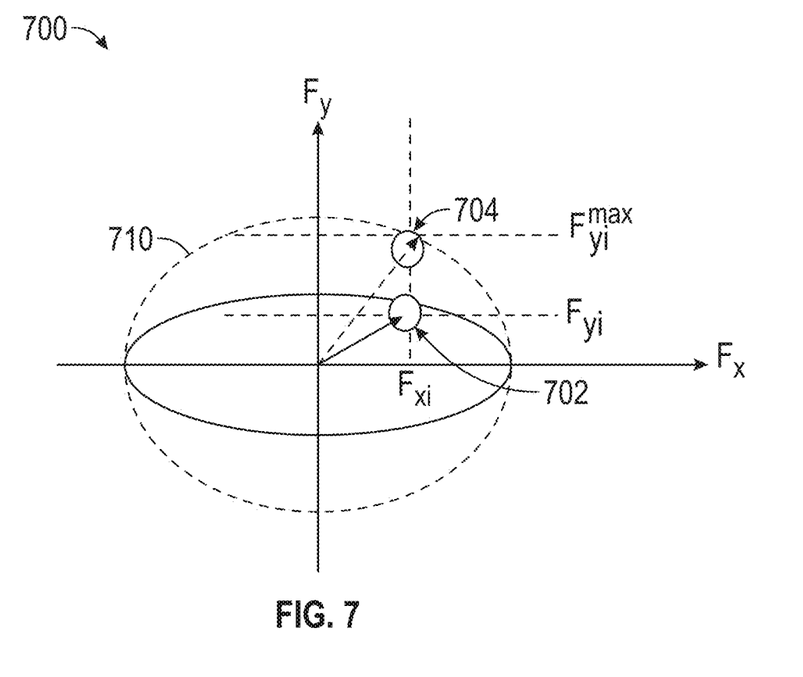
FIG. 7 illustrates a tire ellipse that can be used in a first method for determining maximum lateral forces of a tire.

FIG. 7 illustrates a tire ellipse 700 that can be used in a first method for determining maximum lateral forces. The tire ellipse describes a maximum tire force capacity 710 of the tire. Point 702 indicates the current or actual forces ($F_x$, $F_y$) on the tire at a selected time. From point 702, a vertical line can be drawn to the maximum tire ellipse 710 in order to locate point 704 indicating the maximal lateral force available to the vehicle. This method includes estimation of the longitudinal and normal forces on the tire.

In a second method, one-dimensional interpolation is performed. Peak normalized lateral forces can be determined based on a static normal force and for different slip ratios. Using a current slip ratio, interpolation can be used to compute normalized lateral force on the tire. Load transfer effects can then be applied to the normalized lateral force. This method is requires only an estimation of normal force.

Figure 8:
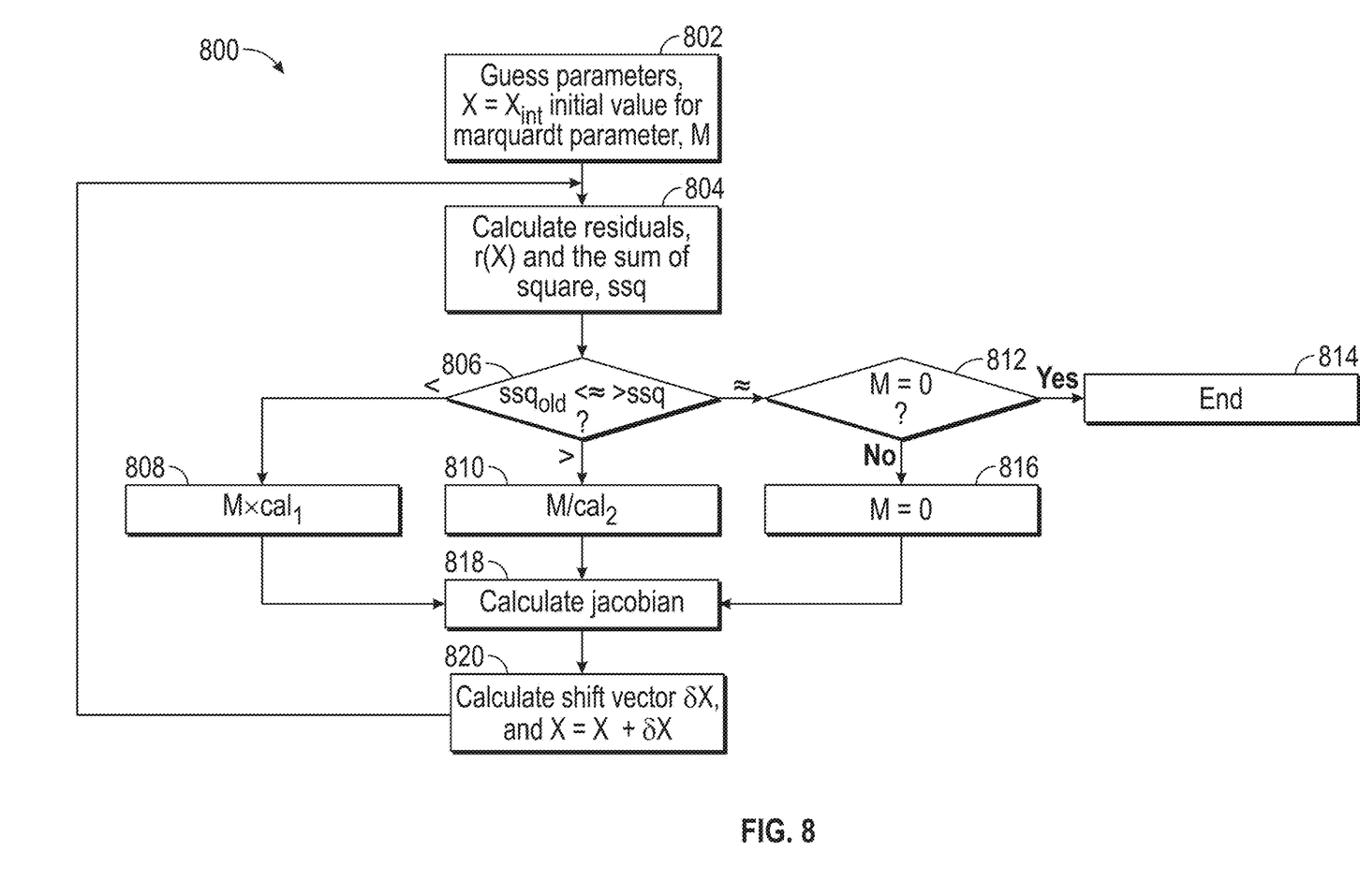
FIG. 8 shows a flowchart of illustrating a method for determining a yaw rate and lateral velocity based on current lateral forces on the tire.

In a third method, two-dimensional interpolation is performed. Peak lateral force is calculated based on slip ratio and normal force and uses empirical tire tables such as those shown in FIGS. 5A-5D FIG. 8 shows a flowchart illustrating a method 800 for determining a yaw rate and lateral velocity based on current lateral forces on the tire using a Levenberg-Marquardt method. The algorithm computes a vector:

$$X = \begin{Bmatrix} v_{des} \\ \psi_{des} \end{Bmatrix}$$

indicating a desired lateral velocity and a desired yaw rate that can be obtained given current forces.

In box 802, an initial estimate of parameter X ($=X_{int}$) is made. The vector X is used to determine a yaw moment. The determined yaw moment is compared to the maximum yaw moment to determine the desired yaw rate and desired lateral velocity, as discussed below. In box 804, a residual sum of squares is determined from the difference between the maximum applicable yaw moment and the determined yaw moment. In box 806, a comparison is made between the residual sum of squares and a sum of squares from a previous iteration (referred to herein as "old sum of squares"). If the residual sum of squares is less than the old sum of squares, then the method proceeds to box 808. In box 808, a damping factor for the Levenberg-Marquardt algorithm is increased. If instead at box 806, the residual sum of squares is greater than the old sum of squares, then the method proceeds to box 810. In box 810, the damping factor for the Levenberg-Marquardt algorithm is reduced. Finally, if instead at box 806, the residual sum of squares is approximately equal to the old sum of squares, then the method proceeds to box 812. In box 812, a check is made to determine whether the damping factor is equal to zero. If the damping factor is equal to zero, then the process ends at box 814. If the yaw moment is not equal to zero, then in box 816, the damping factor is set to zero. After the damping factor has been altered via the processes in either of boxes 808, 810, and 816, the method proceeds to box 818 where the Jacobian matrix is determined. Then, in box 820, a new shift vector δX is selected and is used to determine the next iteration for the parameter ($X_{i+1}=X_i+\delta X$). From box 820, the method returns to box 804. This method continues until a maximum yaw moment is determined to equal zero. The resulting yaw rate and lateral forces are then provided to the DCI in order to operate the vehicle.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating a vehicle, comprising:
   receiving a driver input at the vehicle;
   determining a current lateral force on a tire of the vehicle and a current longitudinal force on the tire for the driver input;
   comparing the current lateral force on the tire to a lateral force capacity of the tire in order to select a performance mode of the vehicle;
   using a least squares method to determine a desired yaw rate and lateral velocity for the vehicle for which a maximum yaw moment of the vehicle is equal to zero, wherein the maximum yaw moment produces a maximum lateral grip on the tire for the current longitudinal force on the tire, wherein determining the desired yaw rate and the lateral velocity includes determining the desired yaw rate and the desired lateral velocity at which front and rear tires of the vehicle saturate at the same time; and
   adjusting the lateral velocity of the vehicle to operate the vehicle at the desired yaw rate and lateral velocity.

2. The method of claim 1, further comprising determining a maximum lateral force on the tire corresponding to the current lateral force on the tire and determining the maximum yaw moment from the maximum lateral force.

3. The method of claim 1, further comprising inputting the desired yaw rate and desired lateral velocity into a Driver Command Interpreter of the vehicle.

4. The method of claim 1, wherein the driver input includes a steering angle, further comprising determining a relative lateral velocity of the tire and a relative longitudinal velocity of the tire from the steering angle and determining the current lateral force on the tire and the current longitudinal force on the tire from the relative lateral velocity and the relative longitudinal velocity.

5. A system for operating a vehicle, comprising:
   a processor configured to:
   receive a driver input at the vehicle;
   determine a current lateral force on a tire of the vehicle and a current longitudinal force on the tire for the driver input;
   compare the current lateral force on the tire to a lateral force capacity of the tire in order to select a performance mode of the vehicle;
   using a least squares method to determine a desired yaw rate and lateral velocity for the vehicle for which a maximum yaw moment of the vehicle is equal to zero, wherein the maximum yaw moment produces a maximum lateral grip on the tire for the current longitudinal force on the tire, wherein determining the desired yaw rate and the lateral velocity includes determining the desired yaw rate and the desired lateral velocity at which front and rear tires of the vehicle saturate at the same time; and
   adjust the lateral velocity of the vehicle to operate the vehicle at the desired yaw rate and lateral velocity.

6. The system of claim 5, wherein the processor is further configured to determine a maximum lateral force on the tire corresponding to the current lateral force on the tire and determine the maximum yaw moment from the maximum lateral force.

7. The system of claim 5, wherein the processor is further configured to input the desired yaw rate and desired lateral velocity into a Driver Command Interpreter of the vehicle.

8. A vehicle, comprising:
a processor configured to:
- receive a driver input at the vehicle;
- determine a current lateral force on a tire of the vehicle and a current longitudinal force on the tire for the driver input;
- comparing the current lateral force on the tire to a lateral force capacity of the tire in order to select a performance mode of the vehicle;
- using a least squares method to determine a desired yaw rate and lateral velocity for the vehicle for which a maximum yaw moment of the vehicle is equal to zero, wherein the maximum yaw moment produces a maximum lateral grip on the tire for the current longitudinal force on the tire, wherein determining the desired yaw rate and the lateral velocity includes determining the desired yaw rate and the desired lateral velocity at which front and rear tires of the vehicle saturate at the same time; and
- adjust the lateral velocity of the vehicle to operate the vehicle at the desired yaw rate and lateral velocity.

9. The vehicle of claim 8, wherein the processor is further configured to determine a maximum lateral force on the tire corresponding to the current lateral force on the tire and determine the maximum yaw moment from the maximum lateral force.

\* \* \* \* \*